Nov. 7, 1950 G. H. RIDINGS 2,529,264

COMBINED FACSIMILE AND CODE SIGNALING SYSTEM

Filed March 8, 1947 2 Sheets-Sheet 1

INVENTOR
G. H. RIDINGS

BY [signature]
ATTORNEY

Nov. 7, 1950 G. H. RIDINGS 2,529,264

COMBINED FACSIMILE AND CODE SIGNALING SYSTEM

Filed March 8, 1947 2 Sheets-Sheet 2

INVENTOR
G. H. RIDINGS
BY
[signature]
ATTORNEY

Patented Nov. 7, 1950 2,529,264

UNITED STATES PATENT OFFICE 2,529,264

COMBINED FACSIMILE AND CODE SIGNALING SYSTEM

Garvice H. Ridings, Summit, N. J., assignor to The Western Union Telegraph Company, New York, N. Y., a corporation of New York Application March 8, 1947, Serial No. 733,295

7 Claims. (Cl. 178—5.6)

Figure 1:
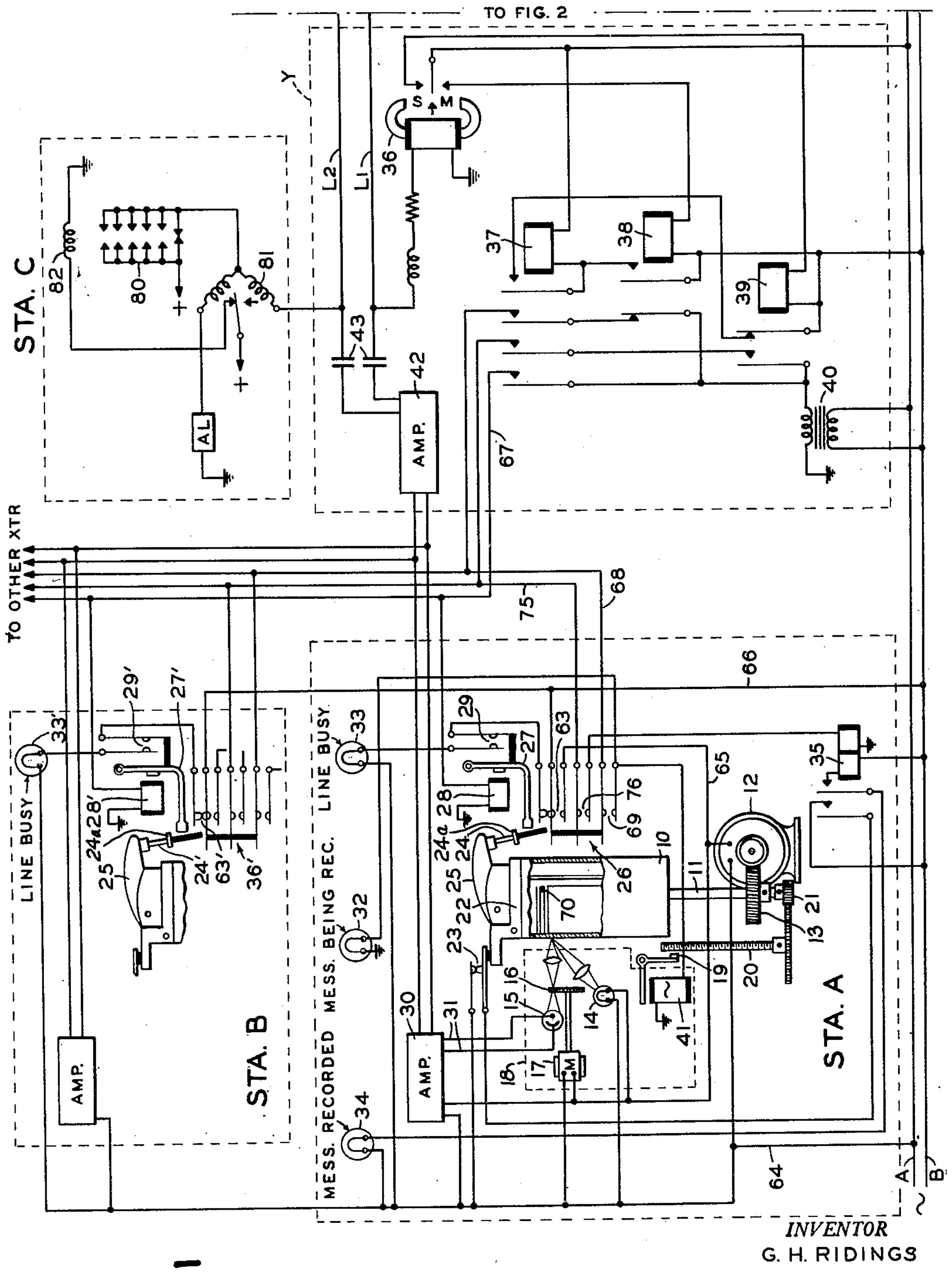

This invention relates to combined facsimile and code telegraph communication, and more particularly to such communication over a common circuit.

The invention is particularly adaptable for use in certain types of customers' offices where several facsimile transmitters, located in different rooms, may be operated one at a time over a common circuit, with a single remote recorder, and where, if desired, code telegraph communication may be also carried on over the circuit.

In such types of facsimile operation it is highly desirable that the facsimile transmitters be controlled from the recording station in order to insure that the recorder is operating at the proper signal level and that it is provided at the start of each recording cycle with a fresh message blank. Moreover, in such types of customers' service, the volume of facsimile transmission does not justify the assignment of an individual recorder, at the central office, to each incoming circuit. It is, therefore, essential that the central office operator, in response to a call from the transmitting operator, assign an idle recorder to the circuit before initiating the operation of the distant transmitter.

One of the objects of the present invention is to enable a plurality of facsimile transmitters to share a common transmission circuit and to effect the control of each of said transmitters from the recording station.

Another object is to provide such a facsimile system in which the control apparatus at the transmitting end of the circuit is common to all of the facsimile transmitters.

A still further object is to enable simultaneous D. C. code telegraph transmission and carrier facsimile to be accomplished over the same circuit.

Another object is to permit all of the control function at the transmitter to be effected from the recording station over one conductor of the interconnected circuit.

Still another object is to provide a facsimile system utilizing a metallic transmission circuit in which one conductor of the circuit is usable for the transmission of D. C. signals for controlling the functioning of the facsimile equipment and the other conductor is usable for either one-way or two-way code telegraph communication.

Other objects and advantages will hereinafter appear.

In accordance with my invention, the facsimile portion of the system includes a plurality of facsimile transmitters associated, over a pair of conductors, with a common recorder. Each transmitter has equal access to the circuit when the circuit is idle, the seizing of the idle circuit being initiated by the transmitting operator at one of the transmitters, and is completed under the control of a signal originating at the receiving office. This signal serves to lock in the calling transmitter and to lock out all of the remaining transmitters until the calling transmitter is subsequently released by the receiving operator. Concurrently with the seizing of the line by one of the transmitters, a signal is operated at the recording station to advise the receiving operator of the call. The operation of the transmitter from this point on is under the control of the receiving operator, who may, by applying the proper polarity of battery to one conductor of the pair, start and stop the transmitter, cause it to repeat the transmission if desired, release the operating transmitter from the line, and unlock the idle transmitters for subsequent operation over the line. These control functions are accomplished through a group of relays located at the transmitting terminal of the line, common to all of the transmitters and responsive to control signals transmitted from the recording terminal. A line amplifier is also provided which is common to all the transmitters.

In addition to the facsimile operation over the circuit, I also provide printing telegraph equipment at each terminal thereof, which may be arranged for either duplex or simplex operation simultaneously with the facsimile operation. The printing telegraph equipment is operated over the other conductor of the pair, appropriate blocking condensers being employed to isolate the facsimile transmitting and recording equipment from the direct current telegraph signals.

Figure 2:
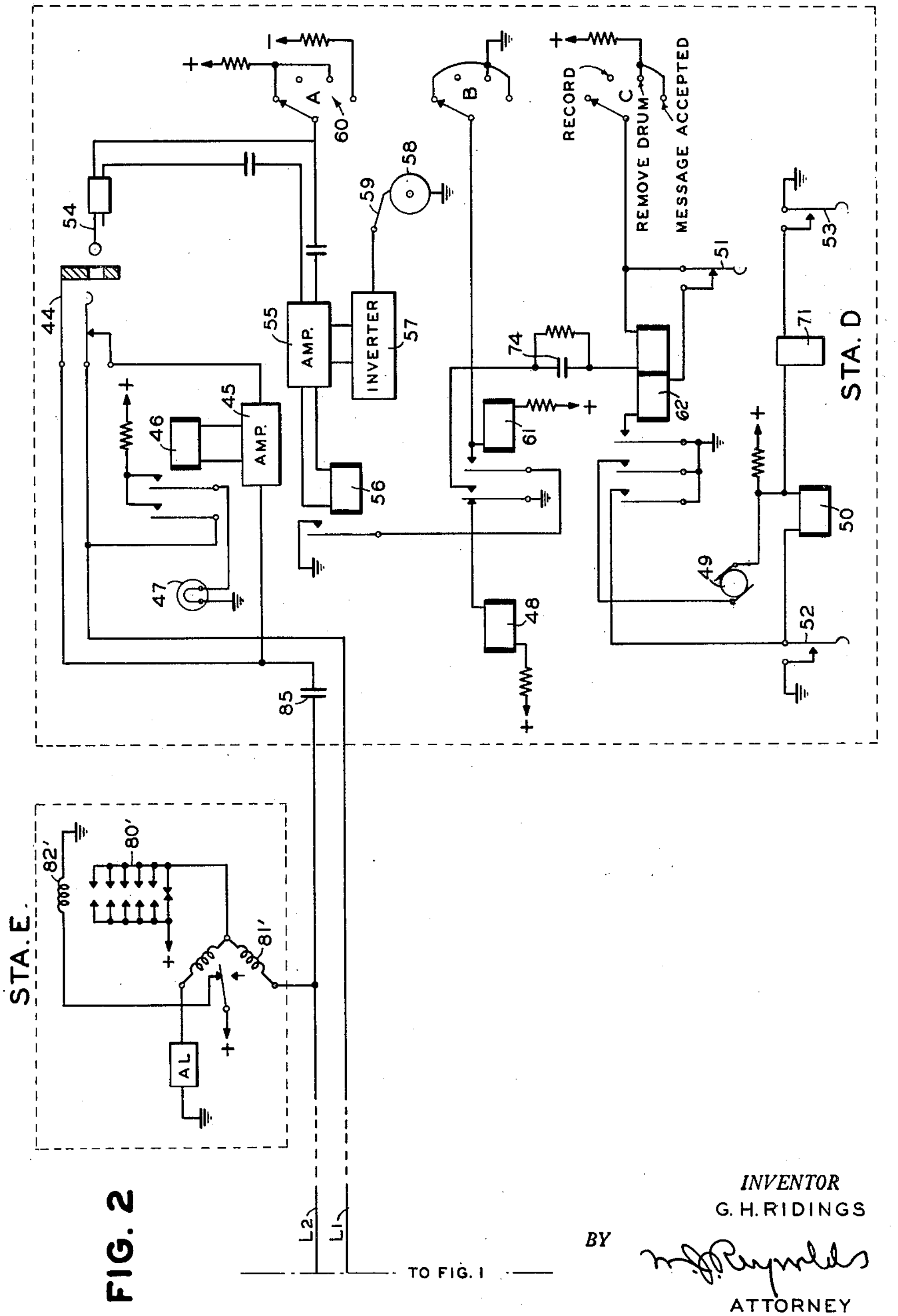

The invention will be more fully understood by reference to the accompanying drawing in which:

Fig. 1 is a schematic diagram showing the facsimile transmitting equipment and printing telegraph equipment at one terminal of the circuit; and Fig. 2 is a circuit diagram of the facsimile recording apparatus and code printing telegraph apparatus at the other terminal of the circuit.

The equipment shown in Fig. 1 comprises facsimile transmitting means at a plurality of offices associated with a common line circuit L1, L2 that at station A being shown complete and that at station B being shown in part only. The facsimile equipment at each of the transmitting offices is controlled through common switching equipment indicated by the rectangle Y. Suitable code printing telegraph apparatus, indicated diagrammatically within the dotted rectangle marked "Station C," is also associated with the line L1, L2.

At the opposite terminal of the circuit as shown in Fig. 2 is a single facsimile recording station marked "Station D" and a code printing telegraph station marked "Station E."

The circuit arrangements are such that any one of the facsimile transmitters may be operated over the line circuit L1, L2 into the facsimile recorder at Station D, and simultaneously therewith two way code telegraph transmission can be carried on between the stations C and E. The nature and the operation of the facsimile equipment will first be described in its entirety, after which the nature and operation of the code printing telegraph apparatus will be described.

Referring first to the equipment and circuit arrangement at station A, the facsimile transmitter is shown as of the vertical type, such as described in the application of R. J. Wise et al. Serial No. 454,768, filed August 14, 1942, now Patent No. 2,469,423, issued May 10, 1949. Briefly, it comprises a vertical transparent cylinder 10 mounted for rotation through the shaft 11 driven by a motor 12 through associated gearing 13. The cylinder 10 is adapted to hold a rolled transmitting message sheet and to scan the same through the wall of the transparent cylinder by an optical system comprising a light source 14, a photocell 15, and an interposed toothed chopper disc 16 driven by a motor 17. This equipment together with appropriate lenses is mounted on a carriage indicated by the dotted line 18 which is movable down the face of the cylinder against a return spring (not shown) upon the engagement of a half nut 19 with a worm 20 driven by the shaft 11 through the gears 21, all as is fully decribed in the aforesaid application. The cylinder 10 is provided at the upper side with a hinged cover 22 capable of being opened to permit the insertion and removal of transmitting message sheets. In its closed position the cover 22 causes the engagement of a pair of contacts 23, these contacts opening with the opening of the cover 22. Pivoted upon the cover 22 is a latch member 24 adapted when depressed by the finger lever 25 to close a contact bank indicated generally at 26, and to be latched in such depressed position by a forked lever 27 operated by a locking magnet 28. The lever 27 on operation permits the closure of a pair of contacts 29, the functions of which will hereinafter appear. In addition to the apparatus described above, the station A includes a preamplifier 30 connected to the output of the photocell 15 by the conductors 31, three signal lamps 32, 33 and 34 for indicating respectively the busy condition of the line, the fact that a message is being recorded at the recording station D, and the fact that the recording of the message has been completed. A relay 35 is also provided at station A for controlling the operation of the "Message Recorded" lamp 34.

The equipment at station B is identical with that of station A but only sufficient thereof is shown to indicate the operation of the locking lever 27' and "Line Busy" lamp 33.

The switch board equipment Y is common to all of the transmitting stations and comprises a polar relay 36 adapted to control through its marking and spacing contacts a set of three control relays 37, 38, 39, the functions of which will appear in the detailed description of the operation. A power transformer 40 is also provided at the switchboard for applying the energy for operating the locking magnet 28, the half nut magnet 41 and the relay 35 at each of the transmitting stations. A line amplifier 42 is also provided at the switchboard, common to each of the transmitting stations. A pair of blocking condensers 43 are interposed between the amplifier 42 and the line L1, L2.

At the receiving station D the line L1, L2 terminates in a jack 44 across the line side of which is bridged an amplifier 45, the output side of which controls a relay 46. The contacts of relay 46 serve respectively to apply positive battery to line L1 and to operate a signal lamp 47.

It is contemplated that the recording apparatus at station D will be of the form shown in Patent No. 2,255,868, granted September 16, 1941, to Wise et al. Briefly, this recorder comprises means for supporting the receiving cylinder in a horizontal position for rotation through a friction clutch controlled by a stop arm through a phasing magnet adapted to be operated by a received signal to start the drum into rotation in phase with the transmitting drum. It further provides for the support of a plurality of spare message blank supporting drums with motor-driven apparatus for changing drums at the completion of each recording operation. The recording is effected electrically by a stylus bearing on the drum, and the scanning is controlled by a half nut magnet, a common magnet being provided when energized to raise the stylus from the cylinder and to remove the half nut magnet from the driving worm.

In Fig. 2 the phasing magnet is indicated at 48, the drum changing motor at 49 and the stylus and half nut magnet at 50. In addition to these elements the recorder is provided with three contacts 51, 52 and 53, contact 51 being associated with the drum changing mechanism to open momentarily near the end of the drum changing operation; contact 52 is arranged to close when there is no drum in recording position, and contact 53 is closed at the end of each recording operation. The mechanism at station D further includes the jack 54 for associating the lines L1, L2 with an amplifier 55 adapted to operate a relay in response to the received carrier signal. The output of the amplifier is connected to a signal inverter 57 from which the received facsimile signals are applied to the recording blank on the drum 58 by means of the stylus 59. A rotary switch, indicated generally at 60, and having three levels A, B and C is provided, each level comprising four contacts. Level A controls the application of positive, negative or zero potentials to the line L1, level B selectively applies ground to a control relay 61, and level C applies battery through its two lowermost contacts to a control relay 62. The function of these relays and the associated mechanism at the recording station will be more fully described in connection with the detailed operation of the apparatus.

Assuming that no facsimile messages are being transmitted over the lines L1, L2, the rotary switch 60 will be upon its uppermost contact with the plug 54 disengaged from the jack 44. Under this condition relay 61 will be operated from level B of the switch but all other parts of the recording apparatus will be deenergized. It is further assumed that a recording drum 58 is in recording position on the recorder. At the opposite terminal of the line L1, L2 the polar relay 36 will be in its mid-position and the relays 37, 38 and 39 will all be deenergized. Also, at each of the stations A, B, etc. there will be no energy in any parts of the circuit. If now an operator at station A desires to transmit a facsimile message to station D, she opens the cover 22 of the transmitting cylinder and places therein the desired message for transmission. On the closing of the cover the contacts 23 close but the circuit therethrough is open at the back contact of relay 35. The operator then notes that the "Line Busy" lamp is unoperated and thereupon depresses the hand lever 25, moving the switch 26 to engage all of its lower contacts. This switch at contacts 63 completes a circuit from terminal A of the power source through the conductor 64 in parallel through the motor 12, exciting lamp 14, chopper motor 17, and the power supply for the amplifier 30, the conductor 65, thence by the contacts 63 and conductor 66 to the opposite side B of the power supply. The motor 12 starts and causes the rotation of the cylinder 10 but the scanning carriage 18 remains stationary since the half nut 19 is disengaged from the worm 20. The light from the lamp 14 is reflected from the cylinder 10 through the chopper disc 16 and received by the photocell 15, amplified by the preamplifier 30 and the line amplifier 42, and applied as a steady tone to the lines L1, L2. At the recording station D this tone is received by the amplifier 45 and causes the operation of relay 46 thereby to operate the signal lamp 47 and apply, through its inner contact, positive battery to the line L1. This positive current operates the polar relay 36 to its marking contact M thereby completing a circuit from the A terminal of the power source through the tongue of relay 36, the marking contact M and the winding of relay 38 to the opposite side of the power supply. The relay 38 through its inner armature and front contact, completes a circuit through the winding of relay 37 from the power source, and the relay 37 at its left-hand armature closes a circuit from the secondary of the transformer 40 and the conductor 67 to the locking magnet 28, 28′, etc., at each of the stations A, B, etc. At station A the locking magnet operates the locking lever 27 to lock the hand lever 25 depressed, thereby retaining the switch 26 in its lowermost position. Up to this time it is necessary for the operator to hold the lever 25 down. At each of the other stations, as station B, the operation of the locking magnet 28′ operates the locking lever 27′ to move beneath the enlargement of the stem 24*a* thereby to lock the lever 25 in its raised position. The movement of the lever 27′ at station B closes the contacts 29′ to thereby complete a circuit through the upper contacts 63′ of the contact bank 26 from the power mains A, B to the "Line Busy" lamp 33′, thus indicating at station B that the line L1, L2 has been seized by another station.

It will be recalled that when the relay 46 at the receiving station operated to apply positive battery to the line L1 thereby to cause operation of the locking levers 27, 27′, etc., that the signal lamp 47 operated to advise the receiving operator of the incoming call. Upon observing this signal the operator, with the rotary switch 60 in its uppermost position, inserts the plug 54 into the jack 44. This operation lifts the amplifier 45 from the lines L1, L2 causing relay 46 to release. Positive battery is not removed from the line L1, however, since this polarity of battery is now connected to the line through the tip of the jack and the first contact of the A level of the rotary switch 60. The amplifier 55 is also connected to the line circuit L1, L2, through the contacts of the jack and the steady tone being transmitted by the chopper disk 16 at the transmitting station is impressed by the amplifier 55 on the relay 56 causing it to operate and thereby closing a locking circuit for the relay 61. This relay, it will be recalled, is operated at this time from the first contact of level B of the rotary switch 60. Since there is no change in the polarity of the line L1 at this time, there is no change in the control circuits at the transmitting stations.

The operator at the recording station D now shifts the switch 60 to the second contact, marked "record." At the B level of the switch this removes ground from the relay 61 but this relay remains locked up through the front contact of relay 56. At the A level of the rotary switch the positive battery is removed from the line L1 and at the opposite terminal of the line this causes the polar relay 36 to return to its mid-position thereby interrupting the operating circuit for the relay 38. Relay 37 remains locked up, however, through its inner front contact. The release of relay 38 completes a circuit from the secondary of the transformer 40, the left-hand tongue and back contact of relay 38, the second tongue and associated contact of relay 37, conductor 68 and the lower contacts 69 of the contact bank 26 to the winding of the half-nut magnet 41, whereupon the half-nut 19 engages the driving worm 20 causing a scanning operation of the scanning carriage 18 to commence. As the carriage 18 moves downwardly, the reflected beam from the light 14 is momentarily interrupted or reduced by a dark spot 70 either on the transparent cylinder or preferably on the message blank within the cylinder, causing a reduction in the intensity of the steady tone being transmitted over the lines L1, L2. This decrease in the signal strength causes the relay 56 at the recording station to release momentarily thereby interrupting the locking circuit to relay 61. Thereupon ground is applied from the left-hand armature of relay 61 and its back contact to the phasing magnet 48 causing release of the drum stop arm, as described in the aforesaid patent, whereupon the receiving drum 58 starts to rotate in phase with the mark 70 on the message back. As the scanning carriage 18 at the transmitter moves downwardly it completes the scanning operation. The transmitted facsimile signals are transmitted over the line, received on the amplifier 55, inverted by the inverter 57 and applied to the stylus 59 in engagement with the recording blank located on the drum 58.

At the completion of the scanning operation, the contacts 53 at the recorder operate, as fully disclosed in the aforesaid patent, to complete a circuit for a buzzer 71, thereby signalling the operator that the recording is completed. The operator thereupon moves the rotary switch 60 to the third or "remove drum" contact.

At level A the positive battery is again applied to the line L1 thereby operating polar relay 36 to its marking contact thus to reenergize relay 38, which through its left contact interrupts the circuit to the half-nut magnet 41, whereupon the half-nut becomes disengaged from the worm 20. The scanning carriage 18 is thereupon drawn by its retractile spring to its upper position. In this position the steady tone is again applied to the line L1, L2 and at the recording station serves to operate the relay 56 to lock up again the relay 61, operated at this time from the B level of the rotary switch in the third position thereof. At the C level of the rotary switch battery is applied to the right-hand winding of the relay 62 and the grounded left armature of the relay 61. Due to the inclusion of the condenser 74 in this circuit, this current is momentary but is sufficient to cause the relay to operate and lock up from ground at its inner armature over a circuit through the left-hand winding of the relay, drum changing contact 51 and the third contact of the C level of the switch 60 to battery. Relay 62 at its left-hand armature applies ground to the half-nut and stylus magnet 58 of the recorder thus lifting the stylus from the surface of the drum and disengaging the half-nut magnet from the driving shaft. The scanning carriage is thus restored to its initial or start position. Relay 62 at its center armature completes a circuit to the drum changing motor 49 which causes the drum changing cycle to occur, whereupon the recorded drum is removed from the machine and a fresh drum applied in recording position. Near the end of this drum changing operation, as appears more fully in the patent referred to, the contact 51 momentarily opens thus interrupting the locking circuit to the relay 62 and causing it to fall back.

The operator now examines the recorded message and if for any reason desires to have the message re-run, whether because it is defective or because she desires a second copy, she returns the rotary switch 60 to the second or "record" contact. This again removes positive battery from the line L1 at the A level, permitting the polar relay 36 to return to its center position thereby to deenergize relay 38 and through its left contact to again energize the half-nut magnet 41 to cause the transmitter to repeat its cycle.

However, if the received copy is acceptable and a scond copy is not desired the operator moves the rotary switch to its lowermost or "message accepted" contact. At levels B and C this does not effect the operation of the recorder since the third and fourth contacts are strapped together at each of these levels. At level A, however, negative battery is applied to the line L1 causing the polar relay 36 at the opposite terminal to move to its spacing contact S. This movement interrupts the operating circuit of the relay 38 and completes an operating circuit for the relay 39 from the power mains A and B. The operating characteristics of relays 38 and 39 are such that relay 39 operates before the release of relay 38 and during this interval a circuit is completed from the secondary of the transformer 40, through the left armature of relay 39, the middle armature of relay 37, connector 75, and contact 76 of the contact bank 26 to the operating winding of the relay 35. This relay operates and locks up to the power supply A and B through its left-hand winding, its inner armature and the closed cover contacts 23. The operation of relay 35 completes a circuit from the power line B, the left contact and armature of relay 35 and message recording lamp 34 to the opposite side of the power source. Lamp 34 thereby signals to the transmitting operator that the transmission has been completed. Immediately after the operation of relay 35, relay 38 releases interrupting the circuit to relay 37, whereupon the contacts of this relay drop back interrupting, at the left-hand contact, the circuit for the locking magnet 28, whereupon the locking lever 27 at station A releases the latch 24 permitting the switch 26 to return to its upper position. This same circuit at station B and other idle stations operates the locking magnet 28′ to unlock the lever 27′ thereby freeing the lever 25 for subsequent operation by the operator when desired. The release of the operating magnet 28′ at each idle station also permits the contacts 29′ to open thereby interrupting the circuit to the "line busy" lamp 33′, whereupon the operator at stations B, etc., is advised that the line is now idle.

At station A, the return of contact bank 26 to its upper position interrupts at contact 63 the operating circuit for the motor 12, the lamp 14, the chopper motor 17 and the amplifier 30 from the power source A, B, thus restoring all the equipment at this station to normal with the exception of the "message recorded" lamp 34 which remains lighted. The operator may now raise the cover 22 to remove the recorded message sheet and in so doing opens the contacts 23, thereby opening the locking circuit to the relay 35 and consequently interrupting the circuit to the message recorded lamp 34. Station A is now completely restored to its inoperative or normal condition.

In addition to the facsimile equipment associated with the lines L1, L2, I have shown two code telegraph transmitting stations C and E connected at opposite terminals of the line conductor L2, in such manner as to permit simultaneous two-way or duplex operation. The equipment at station C comprises a transmitting distributor 80 which may be a Simplex keyboard or tape control transmitter or which, if desired, may be multiplex distributor. Permutation code signals may be transmitted by the distributor 80 through the duplex bridge arrangement 81 to the line L2 and received at station E on the receiving relay 81′ from whence they are repeated to a printer magnet 82 and simultaneously therewith signals may be transmitted from the distributor 80′ at station E to the printer magnet 82 at station C, as is usual in duplex operation. The telegraph signals are isolated from the transmitting facsimile equipment by the condenser 43 in the line L2 and they are likewise isolated from the facsimile receiving apparatus by the blocking condenser 85.

Inasmuch as the code telegraph signals are not permitted to interfere with the operation of the facsimile equipment and since the printing telegraph apparatus will not respond to the frequency of the facsimile signals, it is obvious that simultaneous two-way telegraph transmission can be effected over the circuit L1, L2 at the same time as one-way facsimile operation over this circuit. It should be noted that the control of the facsimile transmitter from the recording station is effected by the use of positive, negative and no current conditions on one line only, namely, L1, thereby leaving the conductor L2 free for code telegraph transmission. This feature of operating facsimile equipment over a circuit with control of the facsimile transmitting apparatus from the facsimile recording station and the simultaneous operation of either one-way or two-way telegraph communication over one of the conductors of the circuit with grounded return forms the basis for certain claims in this application. Further the method of operating a plurality of facsimile transmitters over the circuit under the control of common switchboard equipment and under control from the receiving station either with or without simultaneous code telegraph communication forms the basis of other claims.

It is to be understood that the results described may be obtained in other ways and that modification of the apparatus and circuit arrangements shown may be made without departing from the spirit or essential attributes of the invention and, therefore, I do not desire to be limited to the particular details and arrangements shown but contemplate all such modifications and variations as come within the scope of the appended claims.

What I claim is:

1. A facsimile telegraph system comprising a plurality of facsimile transmitters, a facsimile recorder, a pair of line conductors constituting a transmission circuit common to said transmitters and to said recorder, manual means at each of said transmitters for operatively associating the transmitter with the line conductors for transmission of carrier signals thereover, means at the recorder responsive to said said carrier signals for automatically transmitting a direct current signal over only one of said conductors to said transmitters, automatic means at said transmitters responsive to said direct current signal to lock said calling transmitter into operative association with the line conductors and to lock the other transmitters against operative association with the line conductors, other control means at the recorder for varying the direct current signal over said one conductor for starting a scanning operation of the calling transmitter, and switch means at the recorder operative after a scanning operation for transmitting another direct current signal over said one conductor to deenergize the transmitter, said means at the recorder for transmitting all the direct current control signals over the same line conductor leaving the other line conductor free for supervisory telegraph communication between the transmitting and receiving stations simultaneously with the transmission of facsimile signals over both conductors.

2. A facsimile telegraph system comprising a plurality of facsimile transmitters, a facsimile recorder, a pair of line conductors constituting a transmission circuit common to said transmitters and to said recorder, manual means at each of said transmitters for operatively associating the transmitter with the line conductors for transmission of carrier signals thereover, means at the recorder responsive to said carrier signals for automatically transmitting a direct current signal of one polarity over only one of said conductors to said transmitters, automatic means at said transmitters responsive to said direct current signal to lock said calling transmitter into operative association with the line conductors and to lock the other transmitters against operative association with the line conductors, other control means at the recorder for varying the direct current signal over said one conductor for starting a scanning operation on the transmitter, and switch means at the recorder operative after a scanning operation for transmitting a direct current signal of opposite polarity over said one conductor to deenergize the transmitter, said means at the recorder for transmitting all the direct current control signals over the same line conductor leaving the other line conductor free for supervisory telegraph communication between the transmitting and receiving stations simultaneously with the transmission of facsimile signals over both conductors.

3. A facsimile telegraph system comprising a plurality of facsimile transmitters, a facsimile recorder, a pair of line conductors constituting a transmission circuit common to said transmitters and to said recorder, manual means at each of said transmitters for operatively associating the transmitter with the line conductors for transmission of carrier signals thereover, means at the recorder responsive to said carrier signals for automatically transmitting a direct current signal over only one of said conductors to said transmitters to lock said calling transmitter into operative association with the line conductors and to lock the other transmitters against operative association with the line conductors, and other control means at the recorder for varying the direct current signal over said one conductor for starting a scanning operation on the transmitter, effecting a scanning operation of the transmitter and releasing the transmitter from operative association with the line conductors, said means at the recorder for transmitting all the direct current control signals over the same line conductor leaving the other line conductor free for supervisory telegraph communications between the transmitting and receiving stations simultaneously with the transmission of facsimile signals over both conductors.

4. In a facsimile system, a plurality of facsimile transmitters, a facsimile recorder adapted to be connected to any one of said transmitters by means of a pair of conductors comprising a transmission circuit common to all of said transmitters, control apparatus common to all of said transmitters, means associated with each of said transmitters for initiating a call signal over said circuit to said recorder, means at the recorder automatically responsive to said call signal for transmitting a direct current control signal over one conductor only of said circuit to said control apparatus, means operated by said control apparatus in response to said control signal for effecting a scanning operation of said calling transmitter, other means at the recorder for varying the direct current signal over said one conductor to stop said scanning operation, and code signaling apparatus associated with the other conductor of said pair for transmission of code signals over said conductor simultaneously with said scanning operation.

5. In a telegraph system, a facsimile transmitter, a facsimile recorder, a pair of conductors comprising a facsimile transmission circuit connecting said transmitter and said recorder, code transmitting apparatus at one terminal of said circuit, code receiving apparatus at the other terminal thereof, said code transmitting and receiving apparatus being connected to one conductor of said pair, means at the recorder for transmitting direct current control signals over the other conductor of said pair, means at the transmitter responsive to said direct current signals for starting and stopping the facsimile transmission, and means for electrically isolating said facsimile transmitter and receiver from said code and facsimile control signal transmitting and receiving means whereby facsimile signals, facsimile control signals and code signals may be transmitted and received simultaneously over said circuit.

6. A facsimile telegraph system comprising a plurality of facsimile transmitters, control apparatus therefor, a facsimile recorder and a pair of line conductors constituting a transmission circuit common to said transmitters and to said recorder, means associated with each of the transmitters for initiating a call to the recorder, means at the recorder automatically responsive to a call from any transmitter for transmitting direct current signals to all the transmitters over only one of said conductors, means at said transmitters automatically responsive to said direct current signals for connecting only the calling transmitter in operative association with the recorder over said line conductors and locking the other transmitters against such operative association, means whereby the control apparatus of the calling transmitter automatically responds to the cessation of said direct current signals from the recorder for starting the scanning operation of said transmitter, and means at the recorder for transmitting other direct current signals over only one of said line conductors leaving the other line conductor free for supervisory telegraph communication between the transmitting and receiving stations simultaneously with the transmission of facsimile signals over both of said conductors.

7. A facsimile system comprising a transmitter and a recorder, scanning mechanism at the transmitter and recording mechanism at the recorder, a pair of line conductors constituting a transmission circuit of alternating current facsimile signals from said transmitter to said recorder, a source of direct current potential at said recorder, manually operable means at the transmitter for causing said scanning mechanism to send a steady carrier tone over both of said line conductors, automatic means at the recorder energized in response to said steady tone to apply a selected polarity of said direct current potential to only one of said line conductors, a device at the transmitter automatically responsive to said direct current polarity for locking said manually operable means at the transmitter in operative position, manually operable switch means at the recorder for removing the direct current polarity from said line conductor, electric apparatus at the transmitter automatically responsive to the removal of said direct current polarity for setting said scanning mechanism in operation, electric apparatus at the recorder automatically responsive to the operation of said scanning mechanism for setting said recording mechanism in operation, whereby the facsimile signals transmitted over said pair of conductors are recorded by the recorder, switch means at the recorder manually operable after a scanning operation to apply a direct current potential of opposite polarity to said one line conductor, and relay means at the transmitter automatically responsive to said opposite direct current polarity for deenergizing the transmitter, said means for impressing both polarities of the direct current control potential on only one line conductor leaving the other line conductor free for supervisory telegraph communication between the transmitting and receiving stations simultaneously with the transmission of facsimile signals of both of said conductors.

GARVICE H. RIDINGS.

REFERENCES CITED

The following references are of record in the file of this patent:

UNITED STATES PATENTS

| Number | Name | Date |
|---|---|---|
| 1,728,978 | Parker | Sept. 24, 1929 |
| 2,142,339 | Weaver | June 3, 1939 |
| 2,220,889 | Cole | Nov. 12, 1940 |
| 2,262,715 | Wise | Nov. 11, 1941 |
| 2,333,272 | Riding | Nov. 2, 1943 |
| 2,356,116 | Riding | Aug. 15, 1944 |
| 2,369,578 | Kinkead | Feb. 13, 1945 |
| 2,388,136 | Gardner | Oct. 30, 1945 |
| 2,412,198 | Bacon | Dec. 10, 1946 |